(12) United States Patent
Poyil et al.

(10) Patent No.: US 9,053,389 B2
(45) Date of Patent: Jun. 9, 2015

(54) HOUGH TRANSFORM FOR CIRCLES

(71) Applicant: Analog Devices Inc., Norwood, MA (US)

(72) Inventors: Bijesh Poyil, Bangalore (IN); Anil M. Sripadarao, Bangalore (IN)

(73) Assignee: ANALOG DEVICES, INC., Norwood, MA (US)

( * ) Notice: Subject to any disclaimer, the term of this patent is extended or adjusted under 35 U.S.C. 154(b) by 252 days.

(21) Appl. No.: 13/692,539

(22) Filed: Dec. 3, 2012

(65) Prior Publication Data

US 2014/0153834 A1    Jun. 5, 2014

(51) Int. Cl.
  G06K 9/48    (2006.01)
  G06K 9/62    (2006.01)
  G06K 9/00    (2006.01)
  G06K 9/46    (2006.01)

(52) U.S. Cl.
  CPC .......... G06K 9/6232 (2013.01); G06K 9/00818 (2013.01); G06K 9/4633 (2013.01)

(58) Field of Classification Search
  None
  See application file for complete search history.

(56) References Cited

U.S. PATENT DOCUMENTS

| 6,826,311 | B2 | 11/2004 | Wilt |
| 7,406,212 | B2 | 7/2008 | Mohamed et al. |
| 2002/0126901 | A1 | 9/2002 | Held |
| 2005/0105827 | A1* | 5/2005 | Yonaha et al. ................. 382/291 |
| 2007/0274594 | A1* | 11/2007 | Yasuoka et al. ............... 382/199 |
| 2010/0200660 | A1* | 8/2010 | Moed et al. .................... 235/470 |

FOREIGN PATENT DOCUMENTS

| JP | 4623172 B2 | 2/2011 |
| JP | 5027783 B2 | 9/2012 |
| WO | WO-2012076036 A1 | 6/2012 |

OTHER PUBLICATIONS

Chen, Y. et al. "Novel parallel Hough transform on multi-core processors," in Proc. IEEE Acoustics, Speech and Signal Processing, 2008. ICASSP 2008. IEEE International Conference, Baden-Baden, Germany, pp. 1457-1460 (Apr. 2008).
Davies, E. R. "A modified Hough scheme for general circle location," Pattern Recognition Letters, vol. 7, pp. 37-43 (1987).
Gerig, G. et al. "Fast contour identification through efficient Hough transform and simplified interpretation strategy," In: Proc. of the 8th Int. Conf. on Pattern Recognition, pp. 498-500 (1986).
Goneid, A. et al. "A method for the Hough transform detection of circles and ellipses using a 1-dimensional array," Computational Cybernetics and Simulation, 1997 IEEE International Conference on Systems, Man, and Cybernetics, vol. 4, pp. 3154-3157 (Oct. 1997). Abstract only.
Illingworth J. et al. "A Survey of the Hough Transform," Computer Vision, Graphics, and Image Processing, vol. 44, pp. 87-116 (1998).

(Continued)

*Primary Examiner* — Stephen R Koziol
*Assistant Examiner* — Amandeep Saini
(74) *Attorney, Agent, or Firm* — Patent Capital Group

(57) ABSTRACT

The Hough transform for circles can be implemented in a manner that avoids random access to the Hough accumulator array by successively identifying center candidates in each line of the image based on edge pixels in corresponding lines voting on the line of interest.

29 Claims, 6 Drawing Sheets

(56) References Cited

OTHER PUBLICATIONS

Illingworth, J. et al. "The adaptive Hough transform," IEEE Trans. Pattern Anal. Mach. Intell., vol. 9, pp. 690-698, (May 1987).
Kimme, C. et al. "Finding circles by an array of Accumulators", Short Communications Graphics and Image Processing, Communications of the ACM, vol. 18, issue 2, pp. 120-122, (Feb. 1975).
Raymond, Y. K. K. et al. "Modification of Hough transform for circles and ellipses detection using a 2-dimensional array," Pattern Recognition, vol. 25, issue, 9, pp. 1007-1022, (1992). Abstract only.
Yuen, H.K. et al. "A Comparative Study of Hough Transform Methods for Circle Finding." vol. 8, issue 1, pp. 71-77, (Feb. 1990).
English Translation of Notice of Preliminary Rejection (Non-Final) for Korean Patent Application Serial No. 10-2013-146325 mailed Nov. 14, 2014, 2 pages.

* cited by examiner

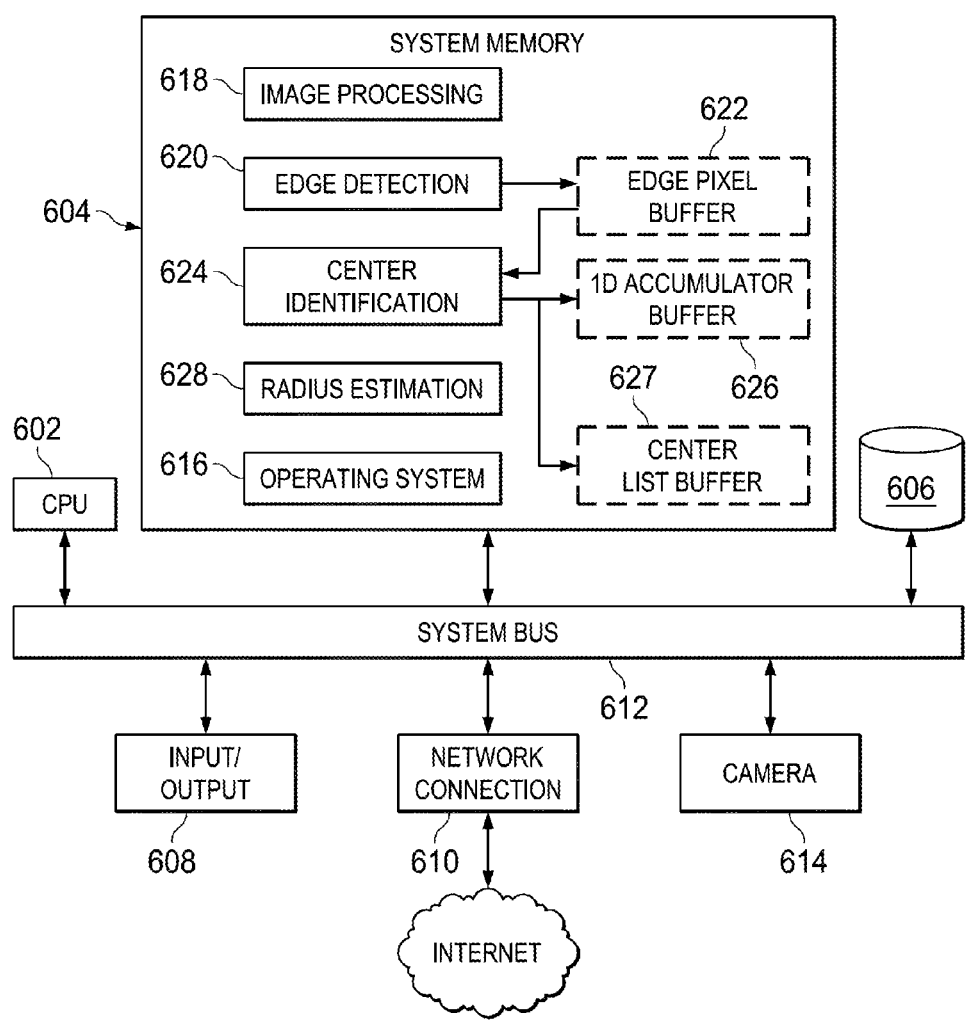

HOUGH TRANSFORM FOR CIRCLES

TECHNICAL FIELD

The present invention relates generally to systems and methods for detecting circles in images, and more specifically to Hough transforms for circles.

BACKGROUND

The detection of round objects is important for many practical applications. For example, it is useful in industrial applications such as automatic assembly and inspection where many components are round in shape. Further, it may be employed to automatically detect traffic signs, which are circular in most European and Asian countries. Circle detection may also be used in biometric applications for iris recognition to localize the inner and outer boundaries of the iris.

A popular image analysis technique for circle detection is the Hough transform for circles. Hough transforms generate parametric representations of lines in an image; they map an image in real space, which typically specifies image values (e.g., brightness or color) as a function of Cartesian spatial coordinates, onto a Hough space spanned by parameters suitable for the lines or curves of interest. For example, straight lines in a two-dimensional image can be mapped onto a two-dimensional parameter space specifying their direction and distance from the origin of the coordinate system, and circles in a two-dimensional image can be mapped onto a three-dimensional parameter space specifying the center coordinates and radii of the circles.

In a straightforward implementation of the Hough transform for circles (also referred to as the Standard Hough Transform or SHT), a three-dimensional accumulator array for the Hough space spanned by the circle centers $(x_c, y_c)$ and radii r is maintained, and the pixels in the real-space image that correspond to edges (i.e., lines at which an image parameter such as brightness, color, or depth undergoes a discrete change) are parsed to "vote" for the elements of the accumulator array by incrementing counters stored for the respective elements. In the simplest embodiment, each edge pixel "votes" for all the accumulator array elements that correspond to potential circles including that pixel: for example, looking for circles with radii in the range from $r_{min}$ to $r_{max}$ an edge pixel with coordinates (x,y) votes for all elements $(x_c, y_c, r)$ in the accumulator array that satisfy the equation $(x-x_c)^2+(y-y_c)^2=r^2$ with $r_{min} \le r \le r_{max}$. Each edge pixel will, thus, be mapped onto a cone section in the Hough parameter space. For edge points that lie on the same circle in real space (i.e., in the original image), these cone sections intersect at a single point. Circles can, thus, be identified by finding the local maxima in the accumulator array.

The SHT for circles requires significant execution time and a large memory for the Hough accumulator array, typically precluding storage of the array in the internal memory of a microprocessor or microcontroller. Further, it entails frequent, random accesses to the accumulator array, impeding the use of direct memory access (DMA) and cache for typical embedded microcontrollers and digital signal processors (DSPs). Accordingly, various modifications to the SHT that reduce processing and memory requirements have been proposed. For example, exploiting knowledge of the directions of edges in the image, the number of accumulator array elements on which an edge pixel votes can be reduced to those elements that correspond to circle centers on a line perpendicular to the edge (or in a region surrounding that line, to account for inaccurate estimates of the edge direction). Further, instead of using a three-dimensional accumulator array, two or more lower-dimensional arrays may be used in succession. For instance, some techniques detect circles in two stages: a first stage to identify possible centers, and a second stage to estimate the radius for each center. While these modifications can improve the performance of Hough-transform algorithms, they typically do not suffice to facilitate buffering the accumulator array in local memory. Further, two-stage algorithms as used in the prior art do not work efficiently when concentric circles or arcs are present in the image. Therefore, robust techniques that further reduce memory requirements and/or execution time are highly desirable.

SUMMARY

The present invention provides systems and methods for the Hough-transform-based detection of circles and/or arcs that reduce or eliminate random accesses to the accumulator array and, thereby, diminish execution time. Various embodiments adopt a two-stage approach in which, first, center candidates for the circles are determined and, second, the radius corresponding to each center is estimated. Unlike prior-art methods, the first stage does not require parsing through all the edge pixels (e.g., in the order in which they are stored in an edge-pixel buffer) and determining, for each pixel, for which elements in a two-dimensional accumulator array that pixel votes, which would require successive accesses to random locations in the accumulator array. Rather, it involves searching the image line by line for potential center candidates. Identifying center candidates in a particular line may include identifying the lines of edge pixels that vote for that particular line (which are typically significantly fewer in number than the lines in the image overall), parsing the identified edge-pixel lines to vote on a one-dimensional accumulator array of possible centers, and determining the maxima of the one-dimensional accumulator array, which correspond to the center candidates. The one-dimensional accumulator array fits, in many embodiments, into local memory (e.g., cache), and can be reused for successive center-pixel lines.

In some embodiments, the voting step is preceded by a filtering step that analyzes the edge-pixel lines collectively (without regard to the individual edge pixels) to determine the total number of edge pixels therein and, based on this total number, eliminates center-pixel lines that do not exceed a specified threshold; this step can significantly reduce the total number of computations in the voting step. Both the filtering step and the voting step may take advantage of the storage of edge pixels in bins for different respective edge directions, and/or of the representation of edge pixel coordinates in separate buffers for the x coordinates and the number of edge pixels in each line. These features may provide additional efficiency gains and further reduce memory requirements.

Accordingly, in a first aspect, the invention is directed to a method for detecting circles in digital images. The method involves computationally detecting edge pixels in an image and storing coordinate information of the detected edge pixels in a plurality of edge buffers based on edge angles associated with the pixels. Each of the plurality of edge buffers may store coordinate information only of edge pixels whose edge directions are within a bin of edge directions associated with that buffer. Collectively, the plurality of edge buffers may provide bins for all possible edge directions. In some embodiments, the coordinate information is stored in two one-dimensional edge buffers for each edge angle: the first edge buffer stores horizontal positions of the edge pixels, and the second buffer stores cumulative total numbers of edge pixels associated with each line of the image (i.e., the total number of edge pixels detected in lines up to and including the line in question).

The method further includes computationally identifying, successively in each of one or more selected lines of the image, centers of circles having radii within a specified range. This step involves (i) identifying, for each edge angle, lines of edge pixels whose distance from the selected line is within the specified range of radii, (ii) parsing the identified lines of edge pixels and, based at least in part on the edge angle and the coordinate information of the detected edge pixels, accumulating votes from the edge pixels on the selected line, and (iii) identifying the centers in the selected lines based at least in part on the accumulated votes (and, optionally, further based on a vote threshold and/or a specified total number of circle centers). In some embodiments, all lines of the image are processed in this manner. In other embodiments, a subset of lines is selected, prior to the identification of centers for each line in the subset, by eliminating lines of the image for which the cumulative number of edge pixels within respective lines of edge pixels whose distance from said line of the image is within the specified range of radii falls below a specified threshold for a specified positive number of edge directions (e.g., one, two, or more edge directions).

In some embodiments, votes from the edge pixels on a selected line are accumulated in a one-dimensional accumulator buffer; this buffer may be reused successively for all of the selected lines. Parsing the identified lines of edge pixels for a selected line of the image may include iterating through the radii within the specified range and, for each iteration, determining an associated line of edge pixels. The identified line of edge pixels may then be parsed to accumulate votes on the selected line of the image by computing a center coordinate associate with each pixel and incrementing a counter for the center coordinate. In some embodiments, the method further includes, for each of the identified circle centers, determining an associated radius by accumulating votes from edge pixels for all edge angles for the radii within the specified range and identifying a maximum of the accumulated votes.

In a second aspect, the invention provides a system for detecting circles in a digital image including a stored array of pixels. The system includes memory for storing coordinate information of edge pixels in the image in a plurality of edge buffers based on edge angles associated with the pixels. As described above, the coordinate information may be stored in two one-dimensional edge buffers for each edge angle (storing horizontal positions of the edge pixels and cumulative total numbers of edge pixels, respectively), and the edge buffers may collectively provide bins for all possible edge directions, with each individual buffer storing coordinate information only of edge pixels whose edge directions are within the bin associated with that buffer. The system further includes a processor configured to identify, successively in each of one or more selected lines of the image and in the manner described above based on the stored coordinate information (and, optionally, based on a vote threshold or a specified total number of circle centers), centers of circles having radii within a specified range. The processor may also be configured to detect edge pixels in the image to store the coordinate information in the memory, to eliminate lines of the image for which the cumulative number of edge pixels within respective lines of edge pixels falls below a specified threshold (for a specified positive number of edge directions), and/or to determine for each of the identified circle centers an associated radius (in the manner described above). During voting, the processor may accumulate the votes from the edge pixels on the selected line in a one-dimensional accumulator buffer (e.g., stored in local memory of the processor), which may be reusable successively for each of the selected lines.

BRIEF DESCRIPTION OF THE DRAWINGS

The foregoing will be more readily understood from the following detailed description, in particular, when taken in conjunction with the drawings, in which:

FIG. 6A is a block diagram illustrating an exemplary general-purpose computer system implementing edge-detection methods in accordance with various embodiments.

DETAILED DESCRIPTION

Figure 1:
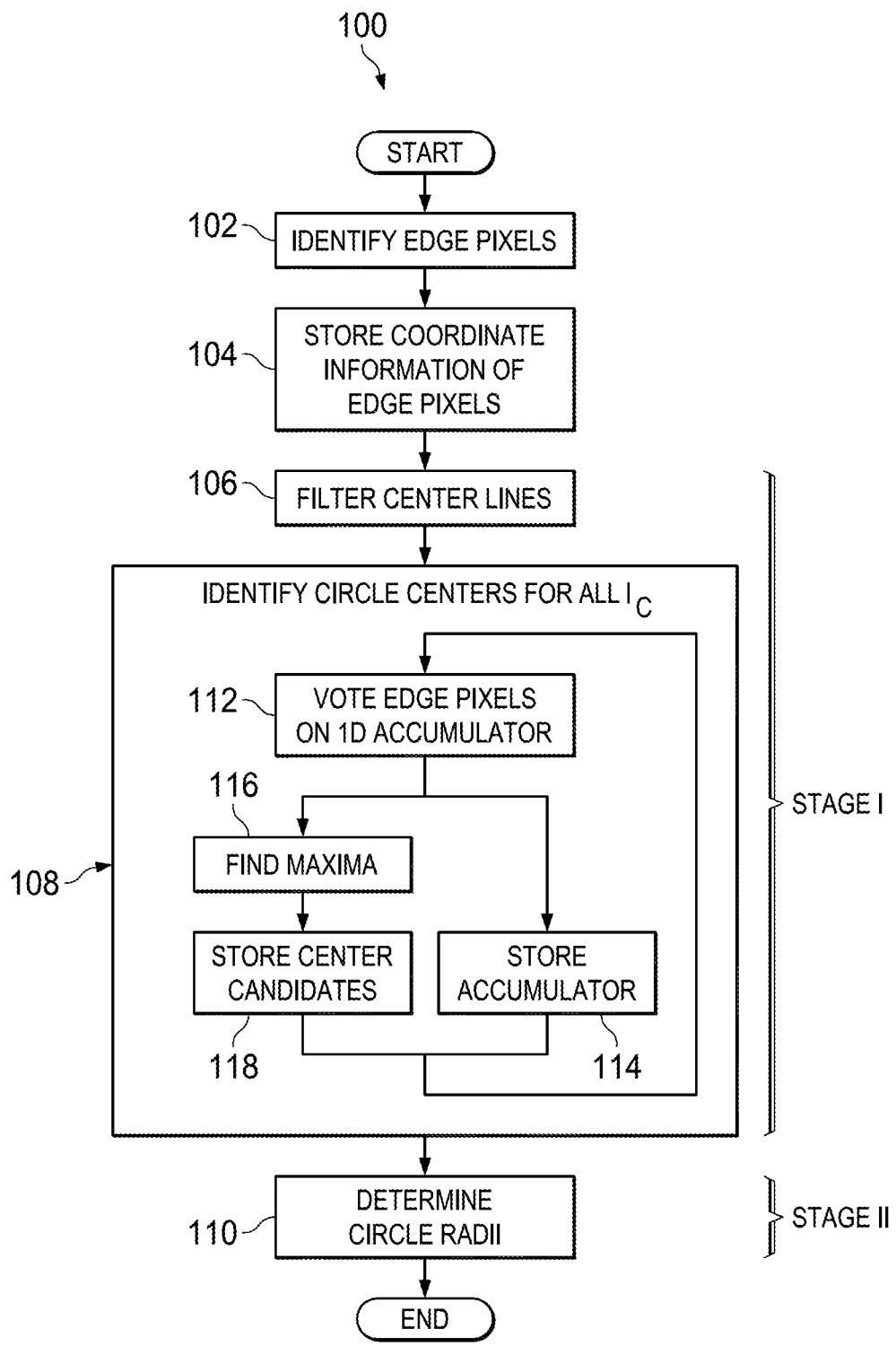
FIG. 1 is a flow chart illustrating circle-detection methods in accordance with various embodiments.

FIG. 1 provides an overview of a modified Hough transform algorithm in accordance with various embodiments. The algorithm 100 takes an image as input, and provides information about the center coordinates and radii of circles and/or arcs detected in the image as output. The output may be provided to the user substantially as is (e.g., in the form of a textual listing of the center coordinates and radii), or may be further processed and, e.g., graphically represented in the form of circle outlines overlaid onto the image. Typically (but not necessarily), the search of the image is limited to circles whose radii fall with a specified range; this range depends on the particular application, and avoids unnecessary computational operations associated with the detection of circles that are too small or too large to be relevant under the circumstances. For instance, for iris recognition methods, it may be assumed that the person whose iris is to be detected is within a certain range of distances from the camera acquiring the image (e.g., a range from 5 cm to 1 m); combined with the typical size range for the human iris, this information facilitates calculating the range of possible radii of the iris detected in the image. Similarly, for the detection of circular traffic signs, the range of radii of interested may be specified based on the apparent size of a regular-sized traffic sign when viewed from a reasonable distance, e.g., a distance between 1 m and 200 m.

As shown in FIG. 1, the first step 102 of circle detection involves parsing the image to identify edge pixels. An edge generally corresponds to a sharp gradient or discrete jump in pixel values (i.e., the values of one or more image parameters associated with each pixel). For example, the brightness or color may abruptly change at the boundary of an object. Further, images acquired with cameras having depth-sensing capabilities may have depth information associated with the pixels, where depth corresponds to the distance of the imaged object from the camera; such information may be used, e.g., to identify the boundaries of foreground objects even if brightness and color do not vary much from the background. Typically, edges are formed at the boundary between two image areas that contrast in at least one image parameter. In some applications, however, the contrast exists between discrete lines and a (more or less uniform) background; in this case, the lines themselves constitute the edges. Edge pixels can be identified using any of a variety of edge-detection methods known to persons of skill in the art, such as, for example, Soble edge detection or Canny edge detection. These methods generally provide a binary output, where each pixel either does or does not belong to an edge. For example, in some embodiments, horizontal and vertical filters are applied over the image, and a pixel is considered an edge pixel if the magnitude of the gradient of some image parameter is greater than a specified threshold. The direction of the gradient gives the edge direction of the pixel.

Figure 2:
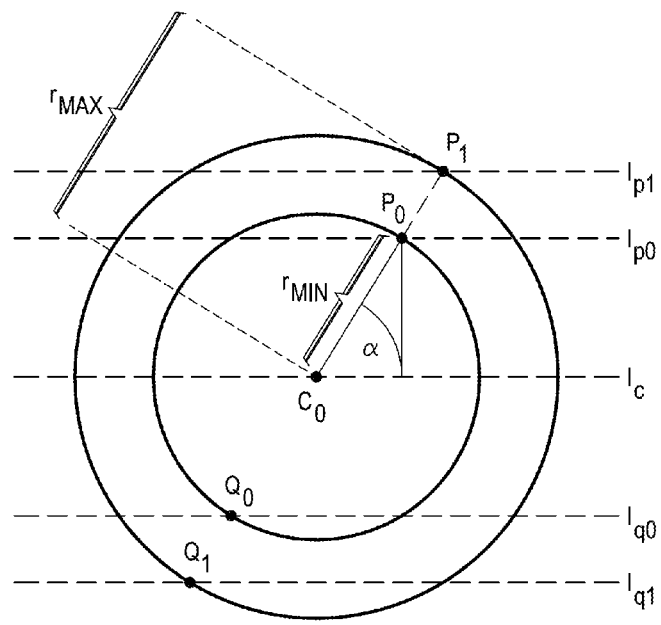
FIG. 2 is a diagram illustrating the relationship between circle centers and edge-pixel lines as exploited in various embodiments.

Once identified as an edge pixel, the coordinate information of that pixel (e.g., its row and column numbers) are stored in a buffer, hereinafter called "edge buffer" (step 104). As used herein, the term "buffer" refers broadly to a dedicated memory area that may be physically distinct and separately addressed or, more commonly, logically partitioned within main memory. Accordingly, a plurality of edge buffers may be separate memory modules, partitions within a single memory, or merely separate entries in a data structure. To facilitate taking the direction of detected edges into account at later processing stages, the edge pixels may be binned according to the direction of the edge to which they belong, and stored in separate buffers for different bins. For example, 32 edge buffers may be used, each corresponding to an angular range of edge directions of 11.25° such that the buffers collectively cover a full 360°. (Alternatively, since edge directions that differ by 180° are ultimately treated the same way, only 16 buffers covering 11.25° each may be used.) For definiteness of the following discussions, edge directions are hereinafter characterized by the angle $\alpha$ spanned between a line locally perpendicular to the edge (corresponding to the radial direction of a circle tangential to the edge) and the horizontal axis (i.e., the axis), as illustrated in FIG. 2. Each bin is represented by a discrete value of $\alpha$ chosen from the range of angles covered by the bin, e.g., the center angle of that range.

Edge buffers may be one-dimensional and simply store a list of coordinate pairs (x,y) for all the edge pixels. Alternatively, the coordinate information may be stored in a different format. For various processing steps of methods in accordance herewith, it is advantageous to store the edge pixel coordinates in two buffers. The first buffer, denoted $Xb_\alpha$ (where $\alpha$ indicates the edge direction), lists only the x coordinates of all the edge pixels in series, e.g., beginning with the coordinates of edge pixels in the first row of the image and moving from left to right, then moving on to the second row of the image (and, again, moving from left to right), etc. The second buffer, denoted $Yb_\alpha[n]$, stores for each row n the number of edge pixels cumulatively detected in all rows up to and including row n. This technique for storing the edge positions reduces the associated memory requirements by about one half. From the buffers $Xb_\alpha$ and $Yb_\alpha[n]$, the full coordinate information (x,y) can be restored straightforwardly: the x coordinates of pixels in a particular line n (which determines the y coordinate) can be found in $Xb_\alpha$ between a starting index given by $Yb_\alpha[n-1]$ and an end index given by $Yb_\alpha[n]$.

The stored edge-pixel coordinate information is used in subsequent steps to vote on the accumulator array for the Hough space. Conceptually, the Hough space can be characterized by a three-dimensional array $[x_c,y_c,r]$ of size M×N×R, where M and N are the numbers of columns and rows, respectively, in the image, and R is the number of discrete radii in the range of interest. Various embodiments, however, adopt a two-stage approach: in stage I (steps 106, 108), the center coordinates $(x_c,y_c)$ of all circles are determined by cumulating votes from edge pixels for all radii r within the range of interest, and in stage II, a histogram of radii r is created for each center identified in stage I to estimate the radius of the corresponding circle (step 110). Moreover, in stage I, rather than creating and voting on a complete M×N array $[x_c,y_c]$ of center coordinates $(x_c,y_c)$, various embodiments interpose a filtering step 106 that determines for each line n in the image whether that line possibly includes one or more circle centers, and eliminates those lines for which the answer is negative (as explained in more detail below with respect to FIGS. 2 and 3).

Lines that survive the filtering step 106 are passed to a voting phase 108, in which potential center coordinates are identified. This process is carried out line by line, i.e., successively for fixed values of $y_c$, and involves, for each line $l_c$, voting on a one-dimensional accumulator array of size M (step 112, explained in more detail below with respect to FIGS. 4A and 4B). The one-dimensional array is typically small enough to be stored locally, e.g., in cache memory, eliminating the need for external-memory accesses during the voting process. When the voting process for a particular line is completed, the one-dimensional array can be sent to external memory and saved (step 114) for later processing (e.g., determination of local maxima); this access is inherently non-random and, therefore, efficiently accomplished via DMA. Alternatively, the local maxima of the accumulator array can be identified immediately (step 116) and stored (step 118) in a separate data structure (e.g., a center-candidate buffer that lists the coordinates of the identified centers), and the accumulator array can then be discarded. Either way, the local buffer storing the one-dimensional accumulator array can subsequently be reused for the next line.

Determining center candidates based on the local maxima of the accumulator array may involve comparing the number of votes for each such maximum against a pre-determined threshold, and retaining only those coordinates as center candidates for which the threshold is exceeded. The number of votes associated with a center candidate may simply be the number of votes on the respective pixel; alternatively, in some embodiments, votes are summed over small sub-arrays surrounding that pixel (e.g., 3×3 arrays having the center-candidate pixels at their respective centers), e.g., to achieve sub-pixel accuracy for the center. In the latter case, multiple (e.g., three) lines of the accumulator buffer are maintained to determine the center candidates. In addition to identifying centers by thresholding, some embodiments specify, a priori, the maximum number of circles to be detected in the image (hereinafter denoted T). In that case, only the top T centers (i.e., those with the highest numbers of votes) are retained. The center candidates identified for a particular line are compared against the data structure storing all the center candidates of previously processed lines, and if the total number exceeds T, candidates that do not fall within the top T are discarded or overwritten by one of the top T candidates.

At the heart of Hough transform algorithms in accordance with various embodiments are the filtering step 106 and the voting step 108, which will now be explained in more detail. Both steps avoid random accumulator access by accumulating votes from all relevant edge pixels for one line of center candidates at a time—rather than parsing through the edge pixels, one pixel at a time, and calculating for which elements in the accumulator array each pixel votes. Further, both steps 106, 108 take advantage of the grouping of edge pixels based on edge angle α.

With reference to FIG. 2, consider a circle center $C_0$ in line $l_c$. For circle radii varying between $r_{min}$ and $r_{max}$, all the edge pixels with edge angle α that vote at the center $C_0$ lie on the line segment $P_0P_1$ between lines $l_{p0}$ and $l_{p1}$, and all the edge pixels with edge angle α+180° that vote at the center $C_0$ lie on the line segment $Q_0Q_1$ between lines $l_{q0}$ and $l_{q1}$. The line numbers can be calculated for each bin from $r_{min}$, $r_{max}$, and α as follows:

$$l_{p0} = l_c - r_{min} \cdot \sin \alpha$$

$$l_{p1} = l_c - r_{max} \cdot \sin \alpha$$

$$l_{q0} = l_c + r_{min} \cdot \sin \alpha$$

$$l_{q1} = l_c + r_{max} \cdot \sin \alpha$$

(In this calculation, α is typically the edge angle representative of a particular bin. However, if the angular ranges covered by individual bins are large, it may be advantageous to use the boundary angles of these ranges to ensure that all relevant edge-pixel lines are identified. Specifically, to compute $l_{p0}$ and $l_{q0}$, the boundary angle that results in the smaller value of sin α may be used, and for $l_{p1}$ and $l_{q1}$, the boundary angle that results in the larger value of sin α may be used, such that the range of lines is expanded.) Conversely, if the line $l_c$ does contain one or more centers, the lines from $l_{p0}$ through $l_{p1}$ and from $l_{q0}$ through $l_{q1}$ should contain edge pixels (theoretically two per center point for each discrete α, but in practice generally more because each value of α represents a range of edge directions, and further because an edge may have a thickness spanning multiple pixels). Since a circle contains pixels with all angles, this is true for every angle α unless the circle is partially occluded.

Figure 3:
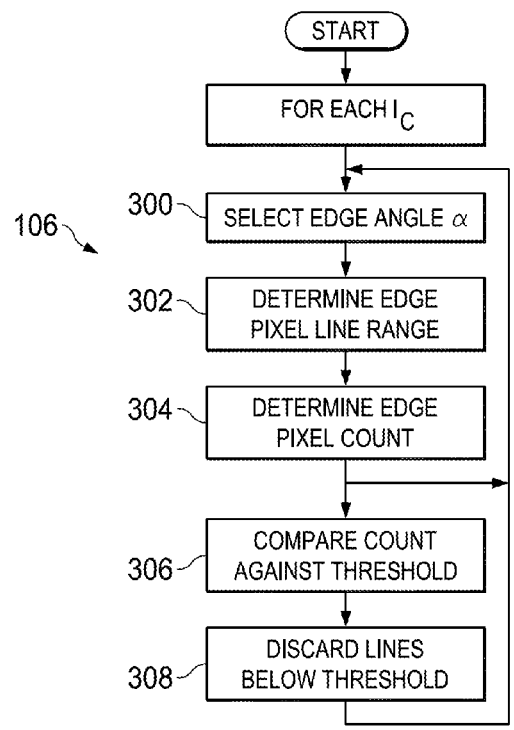
FIG. 3 is a flow chart illustrating, in more detail, a filtering step of FIG. 1 in accordance with various embodiments.

These observations can be used to eliminate lines from the accumulator array $(x_c, y_c)$, as illustrated in FIG. 3. The filtering step 106 generally begins with selecting an edge angle α (step 300), and calculating for that angle $l_{p0}, l_{p1}, l_{q0},$ and $l_{q1}$ to ascertain the ranges of lines that are relevant to—i.e., contain edge pixels that can vote on—centers in line $l_c$ (step 302). Next, the total number of edge pixels within these ranges of lines is determined (step 304). If the edge pixel coordinates are stored in buffers $Xb_\alpha$ and $Yb_\alpha[n]$ as described above, this determination can be made by a simple calculation: the total number of edge pixels in lines n through n+k is simply $Yb_\alpha[n+k]-Yb_\alpha[n-1]$. In step 306, the calculated total number of edge pixels is compared against a specified threshold, and if the threshold is not exceeded, the line $l_c$ is deemed not to have any centers. The threshold will generally be the higher, the larger the bins for the edge direction are, and it may depend on other parameters such as, e.g., image resolution and contrast (which can affect, e.g., the thickness of an edge in numbers of pixels) and the desired trade-off between false positives and false negatives in circle detection. In certain embodiments, the threshold is set or tuned experimentally, for example, by testing the circle-detection algorithm for various threshold settings on images with known (e.g., manually ascertained) circles. If the algorithm is intended to detect only full circles, a line $l_c$ can be discarded (step 308) even if the number of pixels within the relevant lines is below the threshold for only one angle α. On the other hand, to allow for partial occlusions of varying degrees, the elimination of a line $l_c$ may be conditioned upon two or more angle bins below the threshold.

Figures 4A, 5:
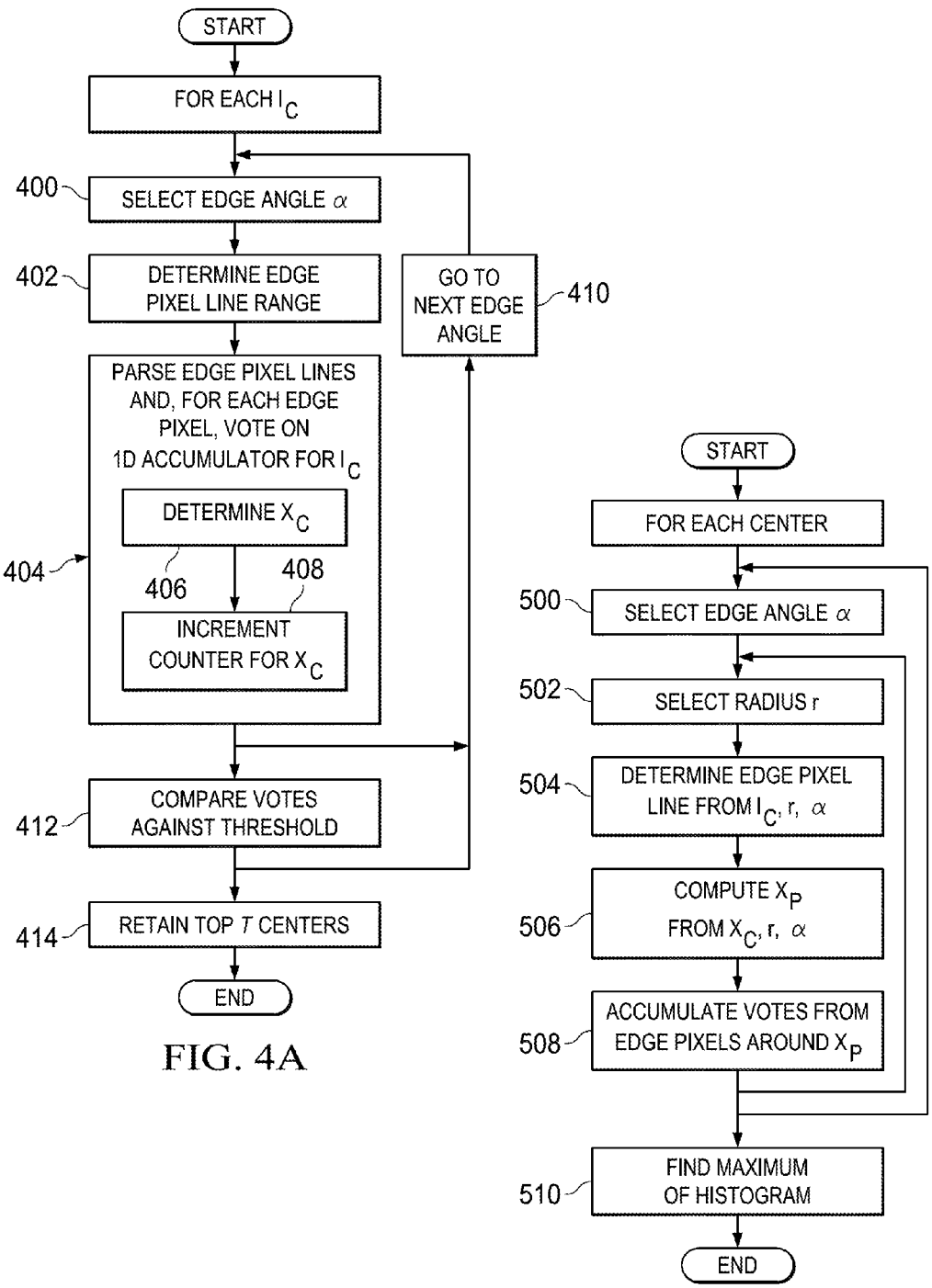
FIGS. 4A and 4B are flow charts illustrating, in more detail, a voting step of FIG. 1 in accordance with various embodiments.
FIG. 5 is a flow chart illustrating, in more detail, a radius-estimation step of FIG. 1 in accordance with various embodiments.

FIG. 4A illustrates how center candidates can, in principle, be determined for those lines $l_c$ that have not been eliminated during the filtering step 106. Like the filtering step 106, this process begins, following selection of an edge angle α (step 400), with identifying the lines of edge pixels for each edge direction that vote on a particular line $l_c$ of the accumulator (step 402). (Of course, these ranges of lines need not be re-calculated, but $l_{p0}, l_{p1}, l_{q0},$ and $l_{q1}$ can be stored following their determination during filtering (step 302) and then simply retrieved in the voting step 108. Further, note that the values of $(r_{min} \cdot \sin \alpha)$ and $(r_{max} \cdot \sin \alpha)$ can be calculated once during an initialization step for all values of α, and $l_{p0}, l_{p1}, l_{q0},$ and $l_{q1}$ may then be calculated for each $l_c$ with simple addition operations.)

In step 404, the lines $l_{p0}$ through $l_{p1}$ and $l_{q0}$ through $l_{q1}$ are parsed, and each pixel therein votes in the one-dimensional accumulator array for line $l_c$ based on its x coordinate and line number. If the edge pixel coordinates are stored in buffers $Xb_\alpha$ and $Yb_\alpha[n]$, parsing the edge lines involves, first, computing the indices for these lines in $Xb_\alpha$ based on the information stored in $Yb_\alpha[n]$, and then parsing $Xb_\alpha$ between these indices. For each edge pixel, the x-coordinate $x_c$ for which the pixel votes in the accumulator for $l_c$ is computed (step 406), and the vote counter in the corresponding element $(x_c)$ of the accumulator is incremented (step 408). An edge pixel in line $l_p$ between $l_{p0}$ and $l_{p1}$ that has x-coordinate $x_p$ votes for the pixel in $l_c$ with x-coordinate $x_c$ given by:

$$x_c = x_p - r \cdot \cos\alpha \text{ with } r = \left|\frac{l_p - l_c}{\sin\alpha}\right|. \qquad (1)$$

Similarly, an edge pixel in line $l_q$ between $l_{q0}$ and $l_{q1}$ that has x-coordinate $x_q$ votes for the pixel in $l_c$ with x-coordinate $x_c$ given by:

$$x_c = x_q + r \cdot \cos\alpha \text{ with } r = \left|\frac{l_q - l_c}{\sin\alpha}\right|. \qquad (2)$$

After all lines are parsed for a particular angle bin a, the process is repeated for the next angle bin (step 410). Since a full circle contains edge pixels of all angle bins with substantially equal number, in some embodiments, votes are compared against a threshold (step 412) before moving on to the next angle bin, and coordinates $x_c$ in $l_c$ for which the votes fall below the threshold are eliminated from the set of center candidates (e.g., by marking them such that they will be excluded from consideration when the next angle bin is processed). In other embodiments, in order to avoid spending too much time checking thresholds and/or to allow for the detection of partially occluded circles, thresholds are only checked after a significant fraction of the bins have been processed. For example, in some embodiments, voting is completed for every other angle bin before the cumulated votes are checked against a suitable threshold. Finally, after voting for all angle bins is completed, the votes of the top T center candidates may be compared against those of previously stored center candidates from other lines, and the top T centers of the combined set may be retained (step 414).

Figure 4B:
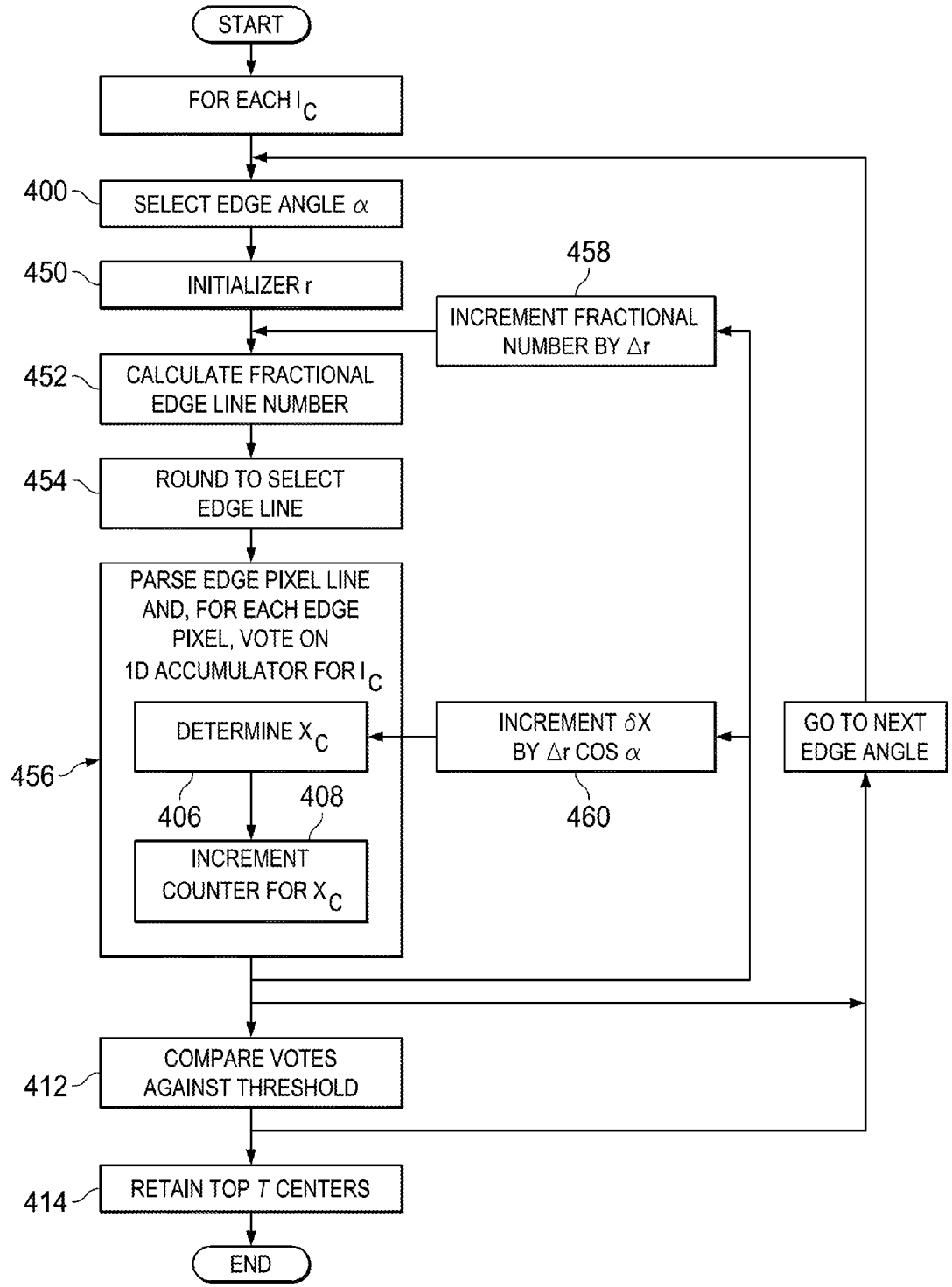

FIG. 4B illustrates an alternative way to identify the center candidates. This modified method accounts for the fact that, in practice, calculating r in accordance with equations (1) and/or (2) can result in inaccuracies for small a because multiple values of r within the range of interest (i.e., between $r_{min}$ and $r_{max}$) can map onto the same edge-pixel line (due to the discreteness of lines and inherent rounding effects). (In the extreme case, α=0, all radii map onto the same line.) One approach to overcoming this problem is to loop through all values of r between $r_{min}$ and $r_{max}$ for each edge pixel and calculate the y-coordinate of the center based thereon (rather than calculating r based on $l_p$ and $l_c$, which correspond to y-coordinates of the edge and center), and choosing that value of r for which the y-coordinate is in the current center line.

The approach in FIG. 4B, however, is more efficient. It involves, for each center line $l_c$ and each edge angle α, looping through the radius in R iterations, beginning, e.g., with $r=r_{min}$ (in initialization step 450) and incrementing r by Δr in each step, where $\Delta r=(r_{max}-r_{min})/R$. In each iteration, an edge-pixel line number $l_p^*$ with fractional precision is calculated from α and the current value of r (step 452) according to $l_p^*=l_c-r\cdot\sin\alpha$ (and similarly for $l_q^*$). This number is rounded to determine the edge-pixel line $l_p$ (or $l_q$) to be parsed (step 454). The center coordinate $x_c$ of the center pixel can now be calculated for each edge pixel in line $l_p$ (or $l_q$) from $x_c=x_p-\delta x$ (or $x_c=x_q+\delta x$) with $\delta x=r\cdot\cos\alpha$ (using the current loop value of r) (step 456). After each iteration, the fractional line position $l_p^*$ is incremented by $\Delta r\cdot\sin\alpha$ (step 458), which may or may not point to the next edge-pixel line, depending on the current fractional number and value of α. Further, δx is updated by $\Delta r\cdot\cos\alpha$ (step 460). After completion of the loop through r (and, optionally multiple or all values of α), the centers are determined by thresholding (step 412) and/or comparing against previously stored centers to retain the top T (step 414) in the same manner as in the embodiment depicted in FIG. 4B. In some embodiments, an additional validation step (not shown) ensures that there are no two centers too close to one another.

After the center coordinates of all (or the desired number of) circles have been identified, the radius of each circle is estimated (step 110) in stage II of the edge-detection method 100. This step 110 involves creating a histogram of radii (between $r_{min}$ and $r_{max}$) for each center with coordinate $x_c$ in line $l_c$ by looping through all edge angles α (step 500) and, for each a, through all radii r (step 502); determining the edge-pixel line $l_p$ (or $l_q$) corresponding to the current value of r (step 504); computing the x-coordinate $x_p$ of the point P in $l_p$ that corresponds to $x_c$ (i.e., $x_p=x_c+r\cdot\cos\alpha$) (step 506); and accumulating votes from edge pixels in line $l_p$ that fall within a specified range around the calculated value of $x_p$ (step 508). Once the votes for all r and a have been collected, the radius r for the circle is identified by finding the maximum of the histogram (step 510).

The circle-detection methods described herein may generally be implemented in hardware, software, or a combination of both. For example, in some embodiments, they are implemented in software and executed by a general-purpose computer, as illustrated in FIG. 6A. The computer 600 generally includes a central processing unit (CPU) 602 and associated system memory 604, one or more non-volatile mass-storage devices and associated drivers 606, input/output devices 608 that facilitate user interaction (e.g., keyboard, mouse, etc.), optionally a network connection 610 (e.g., for access to the Internet or an local network), and a bidirectional system bus 612 over which the other components communicate with each other. A camera 614 or other device that captures the images to be analyzed may send the image data to the computer 600 via a direct connection. Alternatively, the images may be stored, e.g., on a disk, CD, DVD, USB key, or other storage device or on a remotely located server, and read in via a suitable device driver (e.g., a disk drive) 606 or downloaded via the network connection 610, as applicable.

The system memory 604 contains instructions, conceptually illustrated as a group of modules, that control the operation of the CPU 602 and its interaction with the other hardware components. An operating system 616 directs the execution of low-level, basic system functions such as memory allocation, file management, and operation of mass storage devices 606. At a higher level, one or more service applications provide the computational functionality for the detection of circles and/or arcs. These applications may, for example, include a generic image-processing application 618 for filtering, conditioning, or otherwise pre-processing image frames; a conventional edge-detection module 620 for extracting the edge-pixel information and storing them in edge-pixel buffers 622; a center-identification module 624 that implements the filtering and voting steps 108, 110 using a line accumulator buffer 626 and outputs a list of circle centers 627; and a radius-estimation module 628 that determines the radius for each center in accordance with the method illustrated in FIGS. 1-5. Of course, these modules may be combined, further partitioned, or differently organized; as persons of skill in the art will appreciate, the instructions can generally be grouped and organized in many different ways. The instructions may be programmed in any of a variety of suitable programming languages, including, without limitation, C, C++, Basic, Pascal, Fortran, or an assembly language.

Figure 6B:
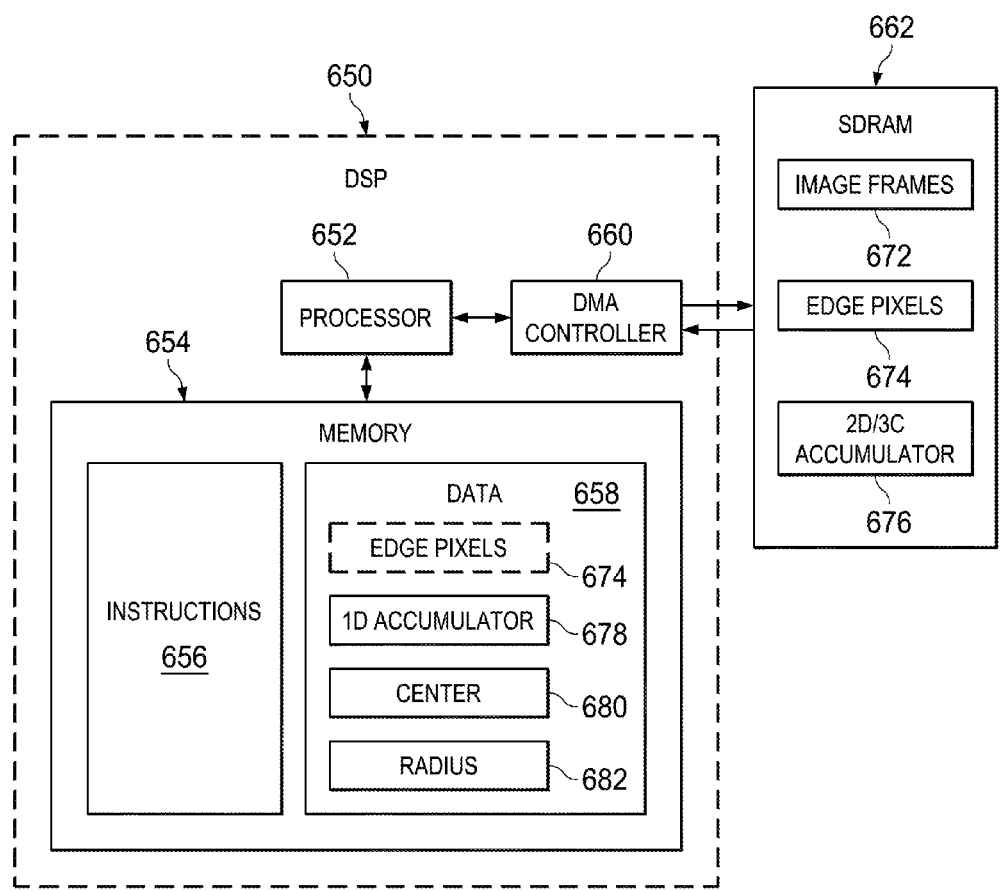
FIG. 6B is a block diagram illustrating an exemplary DSP system implementing edge-detection methods in accordance with various embodiments.

FIG. 6B illustrates, as another exemplary system for carrying out the methods described herein, a DSP implementation. The DSP 650 includes a processor 652 and associated local memory 654, which may include instruction memory 656 and data memory 658, as well as a DMA controller 660 that facilitates access to external (e.g., off-chip) memory 662, which may be, e.g., DRAM or SDRAM (such as DDR, DDR2, DDR3, LPDDR, or LPDDR2). The external memory 662 may include a frame buffer 672 for the images to be processed, a buffer 674 for the edge-pixel coordinate information (e.g., buffers $Xb_\alpha$ and $Yb_\alpha[n]$), and, in some embodiments, a two- or three-dimensional accumulator buffer 676. The local data memory 658 may include a one-dimensional accumulator buffer 678 for the center line $l_c$, a center candidate buffer 680, and a radius histogram buffer 682. In some embodiments, the edge-pixel coordinate information stored in buffer 674 is loaded into local memory 658, and the determination of circles in the image is accomplished entirely locally, without any data exchange with the external memory 662. In other embodiments, the edge-pixel information is obtained from the external memory 662 as needed and/or data from the one-dimensional local accumulator buffer 678 is written out to the external two- or three-dimensional accumulator buffer 674 each time voting on a particular center line has been completed; such access is inherently non-random and, thus, very efficient through DMA.

The system embodiments depicted in FIGS. 6A and 6B are, of course, only examples. In general, the Hough transform methods described herein can be implemented on any general-purpose or special-purpose computing device, including, e.g., special-purpose computers, microcontrollers, application-specific integrated circuits (ASICs), field-programmable gate arrays (FPGAs), digital signal processors (DSPs), or programmable gate arrays (PGAs). Systems in accordance herewith may be deployed as hardware units or software modules within virtually any type of computational device (a computer, tablet, "smart phone," personal digital assistant, specialized appliance, etc.), and may be activated or invoked by high-level applications (e.g., machine-vision applications such as an iris-recognition system).

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. For example, circle-detection methods in accordance herewith need not necessarily include all of the advantageous features and steps described herein, but may achieve performance improvements based on a subset thereof. Accordingly, the described embodiments are to be considered in all respects as only illustrative and not restrictive.

What is claimed is:

1. A method for detecting circles in digital images, the method comprising:
   (a) computationally detecting edge pixels in an image and storing coordinate information of the detected edge pixels in a plurality of edge buffers based on edge angles associated with the pixels; and
   (b) computationally identifying, successively in each of at least one selected line of the image, centers of circles having radii within a specified range by (i) identifying, for each edge angle, lines of edge pixels whose distance from the selected line is within the specified range of radii, (ii) parsing the identified lines of edge pixels and, based at least in part on the edge angle and the coordinate information of the detected edge pixels, accumulating votes from the edge pixels on the selected line, and (iii) identifying the centers in the selected lines based at least in part on the accumulated votes.

2. The method of claim 1, wherein each of the plurality of edge buffers stores coordinate information only of edge pixels whose edge directions are within a bin of edge directions associated with that buffer.

3. The method of claim 2, wherein the plurality of edge buffers collectively provide bins for all possible edge directions.

4. The method of claim 1, wherein the coordinate information is stored in two one-dimensional edge buffers for each edge angle, the first edge buffer storing horizontal positions of the edge pixels and the second buffer storing cumulative total numbers of edge pixels associated with each line of the image.

5. The method of claim 1, further comprising, prior to step (b), eliminating lines of the image for which the cumulative number of edge pixels within respective lines of edge pixels whose distance from said line of the image is within the specified range of radii falls below a specified threshold for a specified positive number of edge directions, the non-eliminated lines constituting the selected lines of step (b).

6. The method of claim 5, wherein the specified positive number of edge directions is one.

7. The method of claim 5, wherein the specified positive number of edge directions is at least two.

8. The method of claim 1, wherein the votes from the edge pixels on the selected line are accumulated in a one-dimensional accumulator buffer.

9. The method of claim 8, wherein the one-dimensional accumulator buffer is reused successively for each of the at least one selected line.

10. The method of claim 1, wherein parsing the identified lines of edge pixels comprises iterating through the radii within the specified range and, for each iteration, determining an associated line of edge pixels and parsing the identified line of edge pixels to accumulate votes on the selected line of the image by computing a center coordinate associate with each pixel and incrementing a counter for the center coordinate.

11. The method of claim 1, wherein centers in the selected lines are identified based further on at least one of a vote threshold or a specified total number of circle centers.

12. The method of claim 1, further comprising, for each of the identified circle centers, determining an associated radius by accumulating votes from edge pixels for all edge angles for the radii within the specified range and identifying a maximum of the accumulated votes.

13. A system for detecting circles in a digital image comprising a stored array of pixels, the system comprising:
   memory for storing coordinate information of edge pixels in the image in a plurality of edge buffers based on edge angles associated with the pixels; and
   a processor configured to identify, successively in each of at least one selected line of the image, centers of circles having radii within a specified range by (i) identifying, for each edge angle, lines of edge pixels whose distance from the selected line is within the specified range of radii, (ii) parsing the identified lines of edge pixels and, based at least in part on the edge angle and the coordinate information of the detected edge pixels, accumulating votes from the edge pixels on the selected line, and (iii) identifying the centers in the selected lines based at least in part on the accumulated votes.

14. The system of claim 13, wherein each of the plurality of edge buffers stores coordinate information only of edge pixels whose edge directions are within a bin of edge directions associated with that buffer.

15. The system of claim 13, wherein the plurality of edge buffers collectively provide bins for all possible edge directions.

16. The system of claim 13, wherein the coordinate information is stored in two one-dimensional edge buffers for each edge angle, the first edge buffer storing horizontal positions of the edge pixels and the second buffer storing cumulative total numbers of edge pixels associated with each line of the image.

17. The system of claim 13, wherein the processor is further configured to eliminate lines of the image for which the cumulative number of edge pixels within respective lines of edge pixels whose distance from said line of the image is within the specified range of radii falls below a specified threshold for a specified positive number of edge directions, the non-eliminated lines constituting the selected lines.

18. The system of claim 13, wherein the processor is further configured to accumulate the votes from the edge pixels on the selected line in a one-dimensional accumulator buffer.

19. The system of claim 18, wherein the one-dimensional accumulator buffer is reusable successively for each of the at least one selected line.

20. The system of claim 13, wherein the processor is further configured to parse the identified lines of edge pixels by iterating through the radii within the specified range and, for each iteration, determining an associated line of edge pixels and parsing the identified line of edge pixels to accumulate votes on the selected line of the image by computing a center coordinate associate with each pixel and incrementing a counter for the center coordinate.

21. The system of claim 13, wherein the processor is further configured to identify the centers in the selected lines based further on at least one of a vote threshold or a specified total number of circle centers.

22. The system of claim 13, wherein the processor is further configured to determine, for each of the identified circle centers, an associated radius by accumulating votes from edge pixels for all edge angles for the radii within the specified range and identifying a maximum of the accumulated votes.

23. The system of claim 13, wherein the system is implemented in an application specific integrated circuit (ASIC), a programmable gate array (PGA), or a digital signal processor (DSP).

24. A non-transitory computer readable storage medium storing one or more computer readable instructions which, when executed on a processor, configure the processor to carry out a method for detecting circles in digital images, the method comprising:
  (a) computationally detecting edge pixels in an image and storing coordinate information of the detected edge pixels in a plurality of edge buffers based on edge angles associated with the pixels; and
  (b) computationally identifying, successively in each of at least one selected line of the image, centers of circles having radii within a specified range by (i) identifying, for each edge angle, lines of edge pixels whose distance from the selected line is within the specified range of radii, (ii) parsing the identified lines of edge pixels and, based at least in part on the edge angle and the coordinate information of the detected edge pixels, accumulating votes from the edge pixels on the selected line, and (iii) identifying the centers in the selected lines based at least in part on the accumulated votes.

25. The non-transitory computer readable storage medium of claim 24, wherein each of the plurality of edge buffers stores coordinate information only of edge pixels whose edge directions are within a bin of edge directions associated with that buffer.

26. The non-transitory computer readable storage medium of claim 24, wherein the method further comprises, prior to step (b), eliminating lines of the image for which the cumulative number of edge pixels within respective lines of edge pixels whose distance from said line of the image is within the specified range of radii falls below a specified threshold for a specified positive number of edge directions, the non-eliminated lines constituting the selected lines of step (b).

27. The non-transitory computer readable storage medium of claim 24, wherein parsing the identified lines of edge pixels comprises iterating through the radii within the specified range and, for each iteration, determining an associated line of edge pixels and parsing the identified line of edge pixels to accumulate votes on the selected line of the image by computing a center coordinate associate with each pixel and incrementing a counter for the center coordinate.

28. A system for detecting circles in digital images, the system comprising:
  (a) means for computationally detecting edge pixels in an image and storing coordinate information of the detected edge pixels in a plurality of edge buffers based on edge angles associated with the pixels; and
  (b) means for computationally identifying, successively in each of at least one selected line of the image, centers of circles having radii within a specified range by (i) identifying, for each edge angle, lines of edge pixels whose distance from the selected line is within the specified range of radii, (ii) parsing the identified lines of edge pixels and, based at least in part on the edge angle and the coordinate information of the detected edge pixels, accumulating votes from the edge pixels on the selected line, and (iii) identifying the centers in the selected lines based at least in part on the accumulated votes.

29. The system according to claim 28, further comprising means for, prior to computationally identifying, eliminating lines of the image for which the cumulative number of edge pixels within respective lines of edge pixels whose distance from said line of the image is within the specified range of radii falls below a specified threshold for a specified positive number of edge directions, the non-eliminated lines constituting the selected lines of (b).

* * * * *